United States Patent [19]

Nakata et al.

[11] Patent Number: 5,206,729
[45] Date of Patent: Apr. 27, 1993

[54] IMAGE SWITCHING APPARATUS FOR PRODUCING SPECIAL VIDEO EFFECTS

[75] Inventors: Tetsuro Nakata; Naotaka Tachibana, both of Kanagawa, Japan

[73] Assignee: Sony Corporation, Tokyo, Japan

[21] Appl. No.: 792,613

[22] Filed: Nov. 15, 1991

[30] Foreign Application Priority Data

Nov. 21, 1990 [JP] Japan .................................. 2-317479

[51] Int. Cl.⁵ ..................... H04N 5/262; H04N 5/268; H04N 9/74
[52] U.S. Cl. .................................... 358/182; 358/181; 358/183; 358/22
[58] Field of Search .................. 358/181, 182, 183, 22

[56] References Cited

U.S. PATENT DOCUMENTS 4,811,104  3/1989  Kawabe .............................. 358/183
5,051,828  9/1991  Chaplin .............................. 358/182

Primary Examiner—James J. Groody
Assistant Examiner—John W. Miller
Attorney, Agent, or Firm—Alvin Sinderbrand; William S. Frommer

[57] ABSTRACT

Image switching apparatus for selecting first or second video signals to be broadcasted, displayed or recorded, thereby producing special video effects. The output of a random noise generator is filtered by a filtering device having a variable filter characteristic that is controlled by an adjustable filter control signal. The filtered random noise signal is compared with a reference level that changes with respect to time, and the output of the comparator controls a switch to select one or the other of the video signals, depending upon whether the filtered random noise signal exceeds the changing reference level, thus producing special image switching effects.

39 Claims, 4 Drawing Sheets

IMAGE SWITCHING APPARATUS FOR PRODUCING SPECIAL VIDEO EFFECTS

BACKGROUND OF THE INVENTION

This invention relates to image switching apparatus and, more particularly, to such apparatus which controls the switching between input video signals by using a switch control signal that varies with respect to time, thereby producing special video effects as a function of the selection between the video signals.

Image switching apparatus is used in video broadcasting, displaying and recording to switch between one video signal representing one particular scene and another video signal representing another scene. For example, one scene may dissolve into another, or a new scene may replace a present scene by "shifting" it out of the video picture. Typically, image switching devices which are used to achieve the foregoing scene changes control the switching between video signals by using a switch control signal, also known as an image switching key signal, that changes over time.

The technique of "shifting" an old scene out of the video picture is known as "wipe switching." Typically, a new scene gradually replaces the existing scene by wiping the video picture with the new scene in a left-to-right or right-to-left direction. This is achieved by gradually replacing each horizontal line of the existing scene with a corresponding horizontal line of the new scene. As the duration of the horizontal line of the existing scene decreases while the duration of the horizontal line of the new scene increases, the "wipe" effect is achieved.

The image switching key signal used to produce this "wipe" effect may change between two conditions, or levels, one of which selects the existing video signal and the other selects the new video signal, with the location of this changeover gradually shifting over time. For example, if the image switching key signal changes near the end of each line interval and if the position at which time change occurs gradually moves toward the beginning of each line interval, the new video signal will begin to replace the existing video signal near the end of each line interval and gradually increase in a right-to-left direction. Thus, the visual effect will be displayed as a new image gradually replacing the existing image in the right-to-left direction. That is, the new image will "wipe" across the existing image in this right-to-left direction. Alternatively, if the image switching key signal occurs near the beginning of each line interval and then gradually shifts toward the end thereof, the video effect will appear as the new image wiping across the existing image in the left-to-right direction. Thus, the "wipe" effect in the resultant video picture is displayed as a new image which appears initially as a small area and gradually increases until it fully replaces the existing image.

Another example of "wiping away" an existing image with a new image is referred to as "noise wipe switching." In this technique, the image switching key signal is controlled by a noise signal so that the switching or image replacement appears somewhat random. Nevertheless, this random-like switching is controlled over time to gradually, yet fully, replace an existing image with a new image. Here, however, the new image initially appears as random noise within the existing image, but the small random-like areas of the new image gradually increase in size until they fully replace the existing image.

An example of a noise wipe operation will best be appreciated by referring to the waveforms of FIG. 6. FIG. 6A is illustrative of a noise signal waveform of the type that can be used to produce the image switching key signal. When the noise signal amplitude is less than a threshold level, the image switching apparatus selects one video signal; and when the noise signal amplitude exceeds the threshold level, the other video signal is selected. Since the noise signal varies in a random manner, the selection between the first and second video signals likewise appears to be random. But, as the threshold level against which the noise signal amplitude is compared decreases, a greater proportion of the noise signal will exceed that threshold and, thus, a greater proportion of the new video signal is selected. Accordingly, if the image switching key signal is assumed to be at a relatively high level ("1") when the noise signal exceeds the threshold level, and at a relatively low level ("0") when the noise signal is less than the threshold level, then the existing video signal is selected when the image switching key signal is a "0" and the new video signal is selected when the image switching key signal is a "1".

FIG. 6A illustrates the change, or decrease, in the threshold level over time. This threshold level changes within the range between $L_{MAX}$, which is greater than the highest amplitude expected in the noise signal, and $L_{MIN}$, which is less than the minimum noise signal amplitude. When the threshold level falls to a first reference level $L_{REF1}$, the image switching key signal appears as shown in FIG. 6B. Here, it is assumed that a new video signal is represented as $X_b$ and the existing video signal is represented as $X_a$. When the noise signal exceeds threshold level $L_{REF1}$, the image switching key signal is a "1" and image $X_b$ is selected. However, when the noise signal falls below this threshold level $L_{REF1}$, the image switching key signal is a "0" and the existing video signal is selected to produce the image $X_a$.

FIG. 6C illustrates the image switching key signal produced when the threshold level is reduced to the reference level $L_{REF2}$; and FIG. 6D illustrates the image switching key signal produced when the threshold level is reduced to the reference level $L_{REF3}$. As the threshold level decreases over time, more of the new video signal is selected, and image $X_b$ gradually replaces image $X_a$.

In implementing the noise wipe technique depicted in FIG. 6, various types of noise signal generators may be used. For example, a memory may be used to store and read out different types of noise signals, such as noise that may appear in a television tuner that is tuned to a non-broadcasting channel, thermal noise inherently generated by transistors, white noise, and the like. The noise signal derived from such stored noise representations is, more or less, random.

Unfortunately, the noise signal generated in a typical noise wipe switching arrangement exhibits poor autocorrelation. Consequently, there may be substantial changes in the noise signal produced from one video field interval to the next. These time changes produce undesirable flicker in the display as one image replaces another. It had been thought that, to eliminate such flicker, the noise signal stored in a memory must be read out repeatedly so that the noise signal produced in each field is substantially the same. This has the undesirable effect of eliminating the random quality of the image switching key signal.

Another drawback associated with previously proposed noise wipe switching apparatus is the general inability to change the noise pattern. Stated otherwise, if a video display of the noise signal is produced, random areas, some large some small, of undefined shape will be observed. It has not been thought possible heretofore to vary such shapes, and particularly the horizontal and vertical dimensions thereof.

These drawbacks of noise wipe switching arrangements have constrained the ability of an operator to artistically vary the manner in which one video image is replaced with another. Thus, creative expression in producing video displays has been somewhat limited.

OBJECTS OF THE INVENTION

Therefore, it is an object of the present invention to provide improved image switching apparatus which overcomes the aforenoted drawbacks and disadvantages.

Another object of this invention is to provide noise wipe image switching apparatus which permits broad creativity in replacing one video image with another.

A further object of this invention is to provide image switching apparatus in which a random noise signal is used to control the switching between video signals, and wherein time changes that result in flicker may be controlled so as to minimize such flicker.

An additional object of this invention is to provide image switching apparatus which uses a random noise signal to control the switching between video signals and wherein shapes of a video display derived from the noise signal may be controlled and adjusted by a user.

Various other objects, advantages and features of the present invention will become readily apparent from the ensuing detailed description, and the novel features will be particularly pointed out in the appended claims.

SUMMARY OF THE INVENTION

In accordance with this invention, image switching apparatus is provided for selecting first or second video signals in a manner such that a video display thereof appears as one image gradually replacing another. A random noise signal is filtered by a filtering device having a variable filter characteristic controllable by an adjustable filter control signal. The filtered noise signal is compared to a reference level that changes with respect to time; and the output of the comparator functions as a switch control signal to select one or the other of the video signals.

As a feature of this invention, the filter includes a recursive filter whose recursive operation is determined by the filter control signal. Preferably, the filter control signal is adjustable by an operator.

In one aspect of this invention, the recursive filter functions as a time change filter for filtering changes in the noise signal over time to reduce flicker in a video display of the filtered noise signal. In another aspect, the recursive filter functions as a shape change filter for filtering changes in the noise signal so as to modify shapes in a video display of the filtered noise signal.

As a still further aspect of this invention, the recursive filter is comprised of cascaded recursive filters for controlling time changes and shape changes in a video display of the filtered noise signal. Preferably, each recursive filter is of similar construction and comprises a delay for delaying the noise signal whose gain is adjusted, a feedback circuit for feeding back an adjustable amount of the delayed noise signal, and a combining circuit for combining the fed back noise signal with the adjustable gain noise signal, the resultant combination being supplied to the delay circuit. In one embodiment, both the adjustable gain of the supplied noise signal and the adjustable amount of the fed back noise signal are responsive to an adjustable filter control signal. Consistent with this embodiment, the gain of the supplied noise signal is adjusted by a multiplier which multiplies the noise signal by a factor K determined by the adjustable filter control signal, and the amount of the fed back noise signal is adjusted by another multiplier which multiplies the fed back delayed noise signal by the factor $(1-K)$.

The delay circuit included in the recursive filter that is used as a time change filter exhibits a time delay substantially equal to a multiple of a video field period, such as one video field period. The delay circuit included in the recursive filter that is used to control the shape of a video display of the noise signal exhibits a time delay substantially equal to one horizontal line period. By varying the multiplier factor K in this recursive filter, the vertical dimension of displayed noise areas may be varied. Alternatively, or in yet another cascaded recursive filter, if the time delay is substantially equal to a fraction of a horizontal line period, the horizontal dimension of shapes in the displayed noise signal may be varied by varying the multiplier factor K.

As yet another feature of this invention, the filtered noise signal that is supplied to the comparator is subjected to variable gain amplification by an amplifier whose gain is determined by detected peak levels included in the filtered noise signal.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
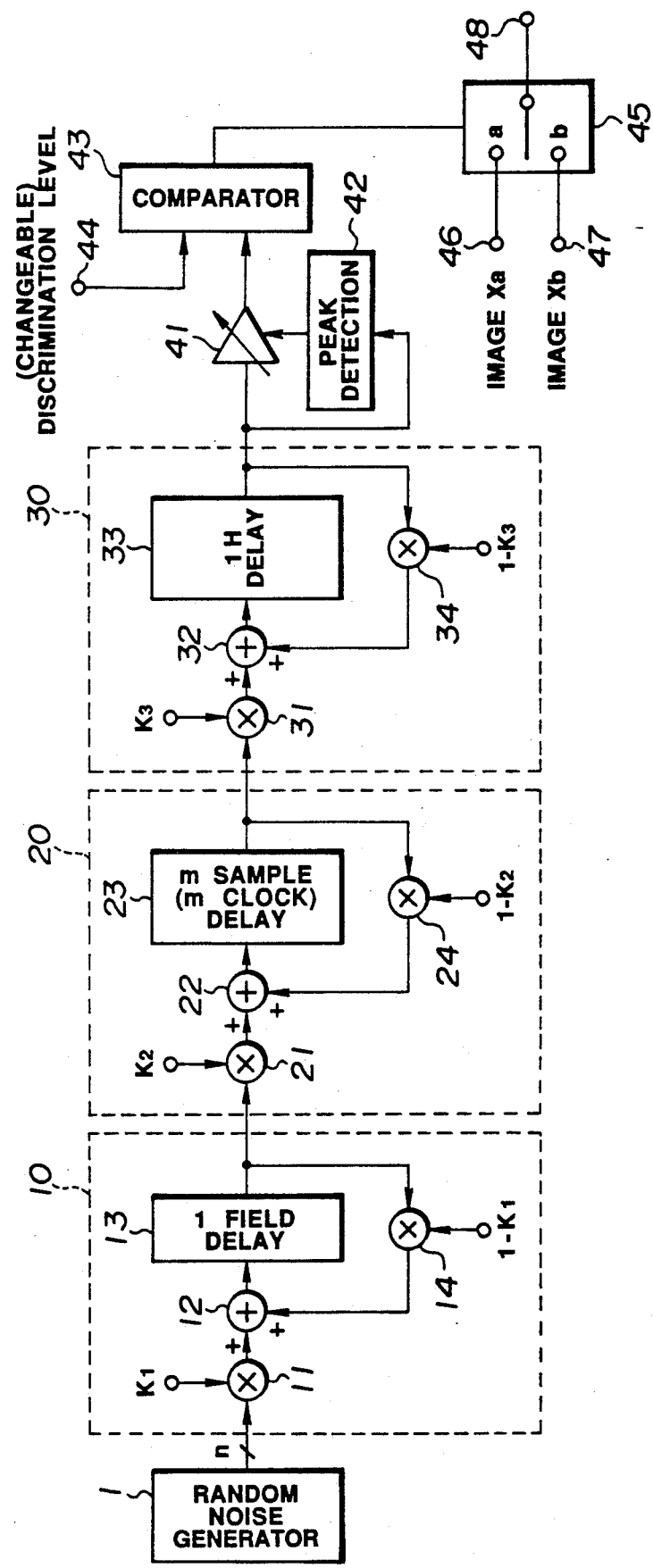
FIG. 1 is a partial block, partial schematic diagram of a preferred embodiment of the present invention.

Referring to FIG. 1, a partial block, partial schematic diagram of a preferred embodiment of the present invention is illustrated as comprising a random noise generator 1, a time change filter 10, shape change filters 20 and 30 and a comparator 43. Random noise generator 1 is adapted to generate a random noise signal and, in accordance with a preferred embodiment, is comprised of an M-series digital random number generator. Typical M-series generators are known to those of ordinary skill in the art for generating successive n-bit words in a random series.

Random-noise generator 1 is coupled to time change filter 10 which is illustrated as a recursive filter and is adapted to control changes in time of the random noise signal produced by the random noise generator. Such time change filtering improves the auto correlation factor of the random noise signal, thereby reducing flicker from one field to the next in a video display thereof. The recursive filter included in time change filter 10 is comprised of a gain adjusting circuit 11, such as a multiplier, coupled to random noise generator 1 and adapted to adjust the gain of the random noise signal by a factor or coefficient $K_1$ supplied to the multiplier from an external, adjustable source. The gain-adjusted noise signal is coupled to a delay circuit 13 by a combining circuit 12 which, in the preferred embodiment, is illustrated as an adder. Another multiplier 14 is coupled to the output of delay circuit 13 and is adapted to feed back an adjustable amount of the delayed noise signal, this amount being determined by a factor $(1-K_1)$ which is supplied to the multiplier from an external source related to the source that is used to supply the coefficient $K_1$ to multiplier 11. Multiplier 14 is connected in feedback relation to adder 12 which combines the gain-adjusted noise signal supplied from random noise generator 1 with that portion of the delayed noise signal fed back by multiplier 11. As illustrated, the combined, or summed, signals are applied to delay circuit 13.

Delay circuit 13 exhibits a time delay substantially equal to a multiple of a video field period and, preferably, this multiple is equal to unity. Hence, the delay circuit may be implemented by a conventional field memory.

Shape change filter 20 preferably is implemented as a recursive filter having a construction substantially similar to the recursive filter used in time change filter 10. It is seen that shape change filter 20 is connected in cascade with time change filter 10 and is comprised of an adjustable gain circuit 21, such as a multiplier, connected to receive the noise signal filtered by time change filter 10 and to vary the gain thereof by multiplying the filtered noise signal by a factor, or coefficient $K_2$. This coefficient $K_2$ is supplied from an external source and, preferably, is adjustable by an operator.

Shape change filter 20 additionally includes a delay circuit 23 whose input is coupled to multiplier 21 by way of a combining circuit shown as an adder 22. Another multiplier 24 is connected to feed back an adjustable amount of the delayed noise signal from the output of delay circuit 23 to adder 22 whereat this adjustable amount of the delayed noise signal is summed with the gain-adjusted noise signal provided by multiplier 21. Multiplier 24 is supplied with the factor $(1-K_2)$, produced by an external source related to that which produces coefficient $K_2$, to multiply the noise signal delayed by delay circuit 23.

Shape change filter 20 is adapted to adjust the horizontal dimension of noise-like areas included in a video display of the noise signal generated by random noise generator 1, as by changing coefficient $K_2$. Accordingly, the time delay imparted to the noise signal by delay circuit 23 is substantially equal to a fraction of a horizontal line period. For example, if a horizontal line period encompasses a number of individual samples, such as a number of pixel samples (in one format known to those of ordinary skill in the art 760 pixels are provided in one horizontal line period), delay circuit 23 may exhibit a time delay substantially equal to m samples, wherein m is an integer. The output of shape change filter 20 is provided by the output of delay circuit 23.

Shape change filter 30, connected in cascade to shape change filter 20, is implemented by a recursive filter and is of a construction similar to that of shape change filter 20. Here, the filtered noise signal provided at the output of shape change filter 20 is coupled to a gain adjusting circuit 31, such as a multiplier, which multiplies the filtered noise signal by the factor, or coefficient $K_3$. This coefficient $K_3$ is derived from an external source and may be adjusted by an operator.

A delay circuit 33 includes an input coupled to multiplier 31 by a combining circuit 32 which, in the illustrated embodiment, is an adder. An output of the delay circuit is fed back to adder 32 by another multiplier 34 which functions to multiply the delayed noise signal provided at the output of delay circuit 33 by a factor $(1-K_3)$. Here too, this factor $(1-K_3)$ is produced by an external source related to that which produces the coefficient $K_3$. The delayed noise signal fed back by multiplier 34 is summed with the gain-adjusted filtered noise signal produced by multiplier 31; and the summed, or combined signals are applied to delay circuit 33 by combining circuit 32.

Thus, in the recursive filters used as time change filter 10 and as shape change filters 20 and 30, a multiplier (11 or 21 or 31) supplies a random noise signal of adjustable gain to a delay circuit (13 or 23 or 33), and an adjustable amount of the noise signal delayed by the delay circuit is fed back by another multiplier (14 or 24 or 34) to be combined with the supplied noise signal.

Filter circuit 10 is adapted to filter time changes in the noise signal to reduce flicker; filter circuit 20 is adapted to adjust the horizontal dimension of noise-like areas in a video display of the noise signal; and filter circuit 30 is adapted to adjust the vertical dimension of the noise-like areas in such video display. Thus, delay circuit 13 exhibits a time delay of one (or a multiple) video field period, delay circuit 23 exhibits a time delay equal to a fraction of a horizontal line period and delay circuit 33 exhibits a time delay equal to one horizontal line period. Time changes in the noise signal are adjusted to reduce flicker by changing the coefficient $K_1$ supplied to multiplier 11 of filter circuit 10; and it is seen that this also results in a change in the factor $(1-K_1)$. A change in the horizontal dimension of noise-like areas in a video display of the noise signal is obtained by changing the coefficient $K_2$ supplied to multiplier 21 of filter circuit 20; and it is seen that this also results in a change in the factor $(1-K_2)$. Finally, a change in the vertical dimension of the noise-like areas in the video display of the noise signal is obtained by changing the coefficient $K_3$ supplied to multiplier 31 of filter circuit 30; and it is seen that this also results in a change in the factor $(1-K_3)$.

The cascaded recursive filters are coupled to comparator 43 by a peak restoration circuit comprised of a variable gain amplifier 41 and a gain control circuit 42. The gain control circuit here is illustrated as a peak detector coupled to the output of the cascaded recursive filters and is adapted to detect peaks in the filtered random noise signal. Variable gain amplifier 41 (also referred to as a gain controlled amplifier) is coupled to the output of the cascaded recursive filters and amplifies the filtered random noise signal with a gain determined by peak detector 42. The amplified random noise signal produced by gain controlled amplifier 41 is coupled to one input of comparator 43.

The comparator is adapted to level-discriminate the amplified noise signal supplied thereto. More particularly, comparator 43 operates to determine if the amplitude of the filtered, amplified noise signal is greater than or less than a variable reference level supplied to another input thereof by way of an input terminal 44. The variable reference level is supplied from an external source and changes with respect to time. In the preferred embodiment, the reference level, which may be a DC level, decreases with time. Comparator 43 produces a switch control signal, also referred to herein as an image switching key signal, as a function of whether the filtered, amplified noise signal is greater or less than the variable reference level supplied thereto. In one example, the switch control signal is a "1" when the filtered, amplified noise signal exceeds the reference level applied to input terminal 44; and the switch control signal is a "0" when the filtered, amplified noise signal is less than this reference level.

The output of comparator 43, namely the switch control signal produced thereby, is coupled to a switching circuit 45 adapted to select a first video signal supplied to input 46 thereof or a second video signal supplied to input 47. Thus, switching circuit 45 is adapted to select image $X_a$ produced from the video signal supplied to input 46 or to select image $X_b$ produced from the video signal supplied to input 47. In the example described herein, switching circuit 45 selects image $X_a$ when the switch control signal produced by comparator 43 is a "0" and image $X_b$ is selected when the switch control signal is a "1". Depending upon the condition of switching circuit 45, one or the other of the two video signals is provided at output terminal 48.

It will be appreciated that, in the noise wipe operation carried out by the image switching apparatus shown in FIG. 1, video signals representing image $X_a$ are gradually replaced by video signals representing image $X_b$. Initially, the $X_b$ video signals appears as relatively weak noise disturbances in a display of image $X_a$. Thus, initially, image $X_b$ appears as noise in image $X_a$. However, gradually, image $X_b$ replaces image $X_a$ and, before the switching apparatus selects the video signals representing image $X_b$ exclusively, image $X_a$ appears as noise-like interference in the video display of image $X_b$. This gradual replacement of image $X_a$ by new image $X_b$ is similar to that shown in FIGS. 6A–6D. However, the present invention facilitates artistic creativity in noise wipe switching by minimizing flicker that otherwise may be present in the displayed image and by enabling the operator to adjust the changeover from one image to another by varying the shape of the noise-like interference of an existing image with the new image.

Figure 2:
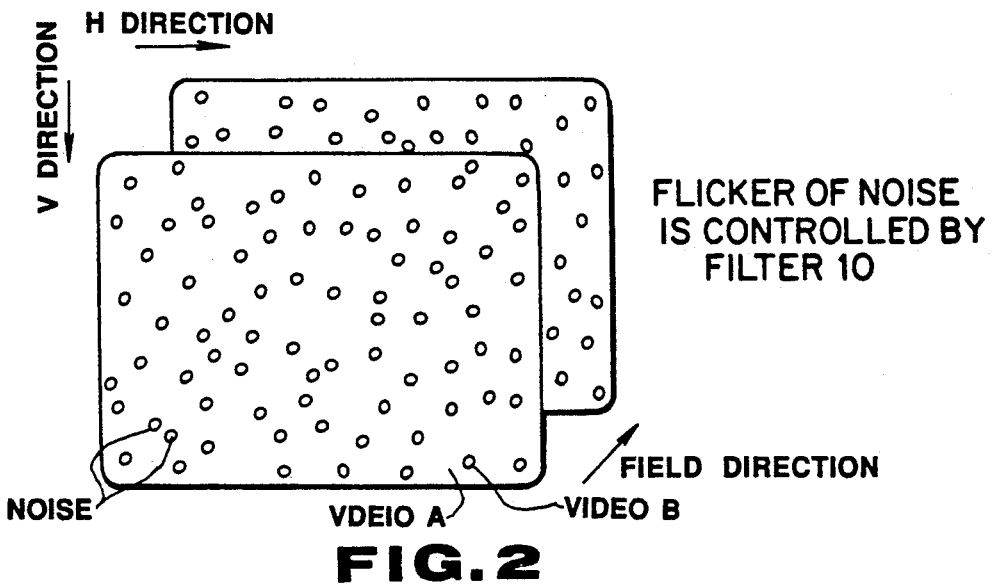
FIGS. 2-4 are schematic representations of video displays of noise signals whose time and shape changes are controllable in accordance with the present invention.

Referring to FIG. 2, there is illustrated two successive fields of a video display of the random noise signal produced by, for example, an M-series random number generator that can be used as random noise generator 1. It will be recognized that if the M-series generator produces 8-bit random noise signals, 256 different levels may be generated. With such random generation by the M-series generator, the noise signal produced during one field may have no correlation or relationship with the noise signal produced during the next field. As a result, when the noise signal is used to produce a video switching signal, flicker in the video display may become quite noticeable. This, of course, is not desired. Such flicker is reduced by time change filter 10 which filters the changes in the noise signal from one field to the next.

If coefficient $K_1$ supplied to multiplier 11 is assumed to be 1, filter 10 undergoes no recursive action because the factor used to multiply the delayed noise signal which is fed back to combining circuit 12 is 0. Thus, the random noise signal provided at the output of time change filter 10 remains completely random and exhibits no field correlation. However, if coefficient $K_1$ is reduced, factor $(1-K_1)$ is increased, thereby feeding back a proportion of the delayed noise signal appearing at the output of delay circuit 13. Consequently, there is an increase in the recursive action of filter 10, resulting in a stronger field correlation of the noise signal provided at the output of filter 10. Therefore, the amount of noticeable flicker in the video display of the noise-wiped image signal is reduced substantially. If coefficient $K_1$ is reduced to 0, the noise signal recirculated in filter 10 will not change. Hence, the randomness of the image switching key signal likewise is reduced to 0, and virtually no flicker will be present in the video display.

Figure 3:
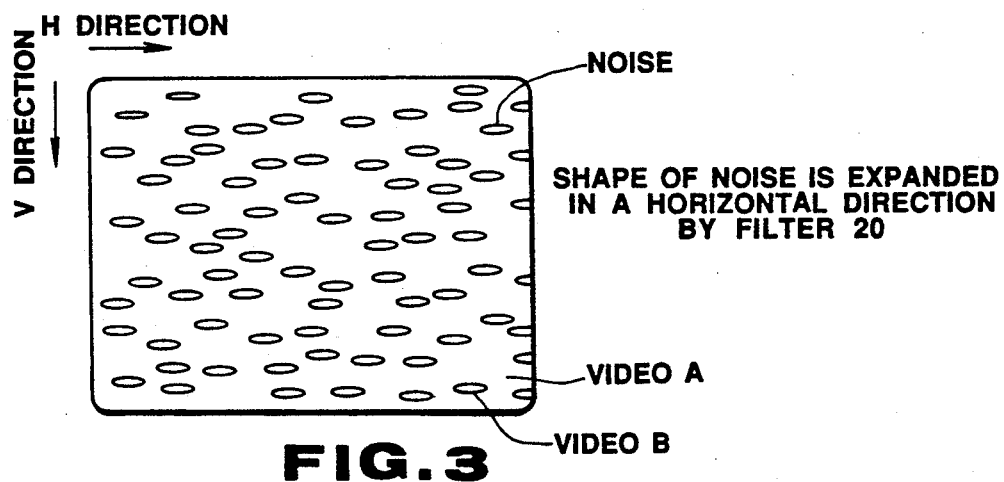

The effect of shape change filter 20 is best appreciated by referring to FIG. 3 which depicts a video display of the random noise signal that would be produced if the noise signal is subject only to the recursive filtering action of filter 20. Here, as coefficient $K_2$ changes, the shape of the noise-like area in the video display derived from the filtered noise signal likewise changes in the horizontal direction. For example, if coefficient $K_2$ is set equal to 1, the factor $(1-K_2)$ is equal to 0 and none of the delayed noise signal provided at the output of delay circuit 23 is fed back. Thus, filter circuit 20 operates simply to delay by m samples the random noise signals supplied thereto. No change in the horizontal direction of the noise-like areas is achieved.

However, a reduction in coefficient $K_2$ results in an increase in factor $(1-K_2)$, thereby feeding back a proportion of the random noise signal delayed by delay circuit 23. As $K_2$ decreases, this fed back proportion increases. This, in turn, increases the correlation of the random noise signal in the horizontal direction (as viewed in a video display) so as to increase the horizontal dimension of the noise-like areas of the display. This increase of the area in the H-direction is depicted in FIG. 3. If coefficient $K_2$ is 0, horizontal correlation of the video display of the noise signal is at a maximum.

Shape control filter 30 varies the shape of the aforementioned noise-like areas of the video display of the noise signal by changing the coefficient $K_3$. If coefficient $K_3$ is set equal to 1, factor $(1-K_3)$ is 0, resulting in no feedback of the delayed random noise signal produced at the output of delay circuit 33. Thus, no recursive operation is effected by recursive filter 30; and filter simply delays the random noise signals supplied thereto by one horizontal line period (i.e. a 1 H delay).

Figure 4:
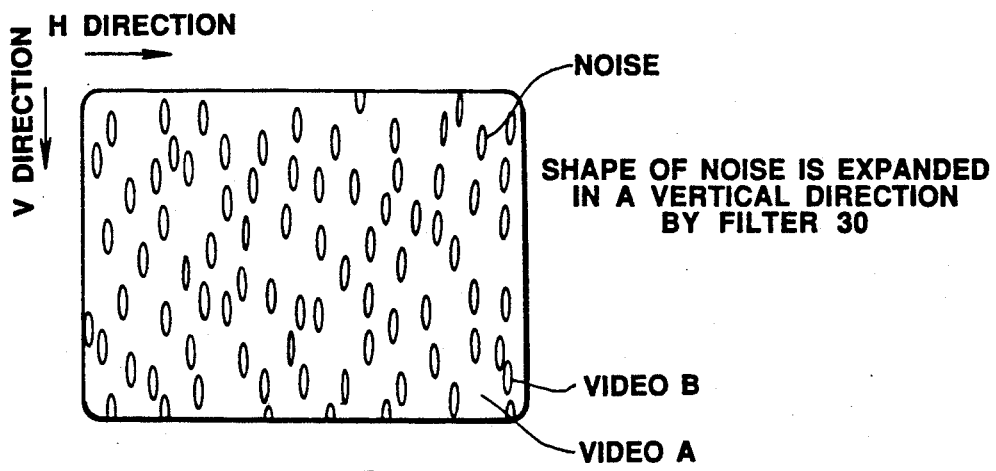

Assuming that the noise signal produced by random noise generator 1 is subjected to the filtering operation of recursive filter 30 only, as coefficient $K_3$ decreases, factor $(1-K_3)$ increases to increase the proportion of the delayed noise signal fed back thereby. Hence, correlation of the noise signal in the vertical direction (as would be viewed in a video display of the noise signal) increases so as to increase the vertical dimension of the noise-like areas which are present in that display. This change in the vertical shape of the noise-like areas is depicted in FIG. 4. It is appreciated that maximum vertical correlation is attained if coefficient $K_3$ is 0.

Thus, by changing coefficients $K_1$, $K_2$ and $K_3$, individually or in various combinations, flicker and noise-like shapes in the video display of images being switched may be controlled by the user who thus has the opportunity to exercise his artistic creativity in image changeover. Thus, noise wipe switching can be adjusted as the operator wishes.

Figure 5A:
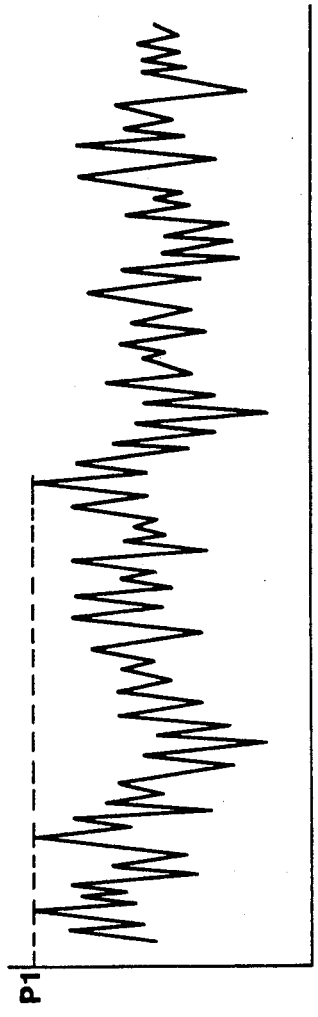
FIGS. 5A-5C are waveform diagrams which are useful in understanding the peak level restoration feature used by the present invention.
Figure 5B:
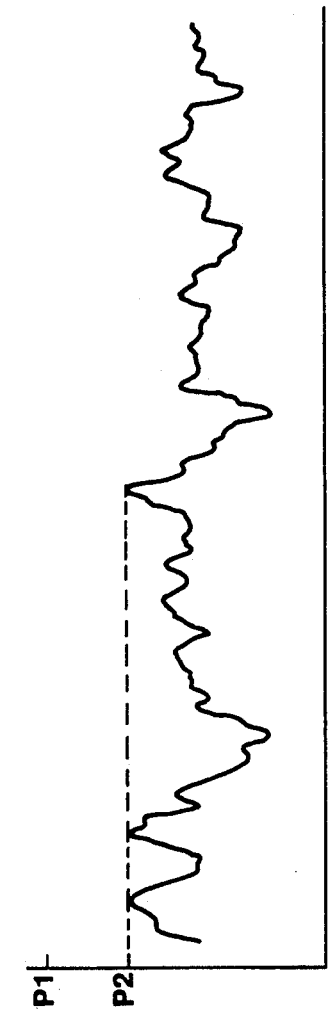
Figure 5C:
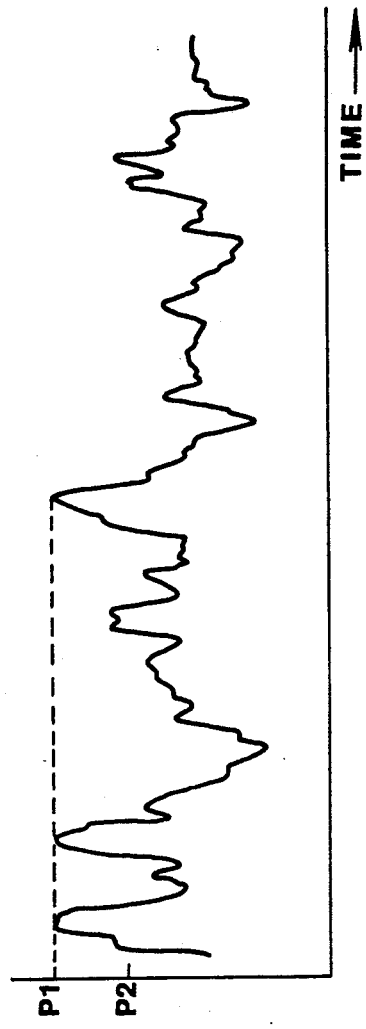
Figures 6A, 6B, 6C, 6D:
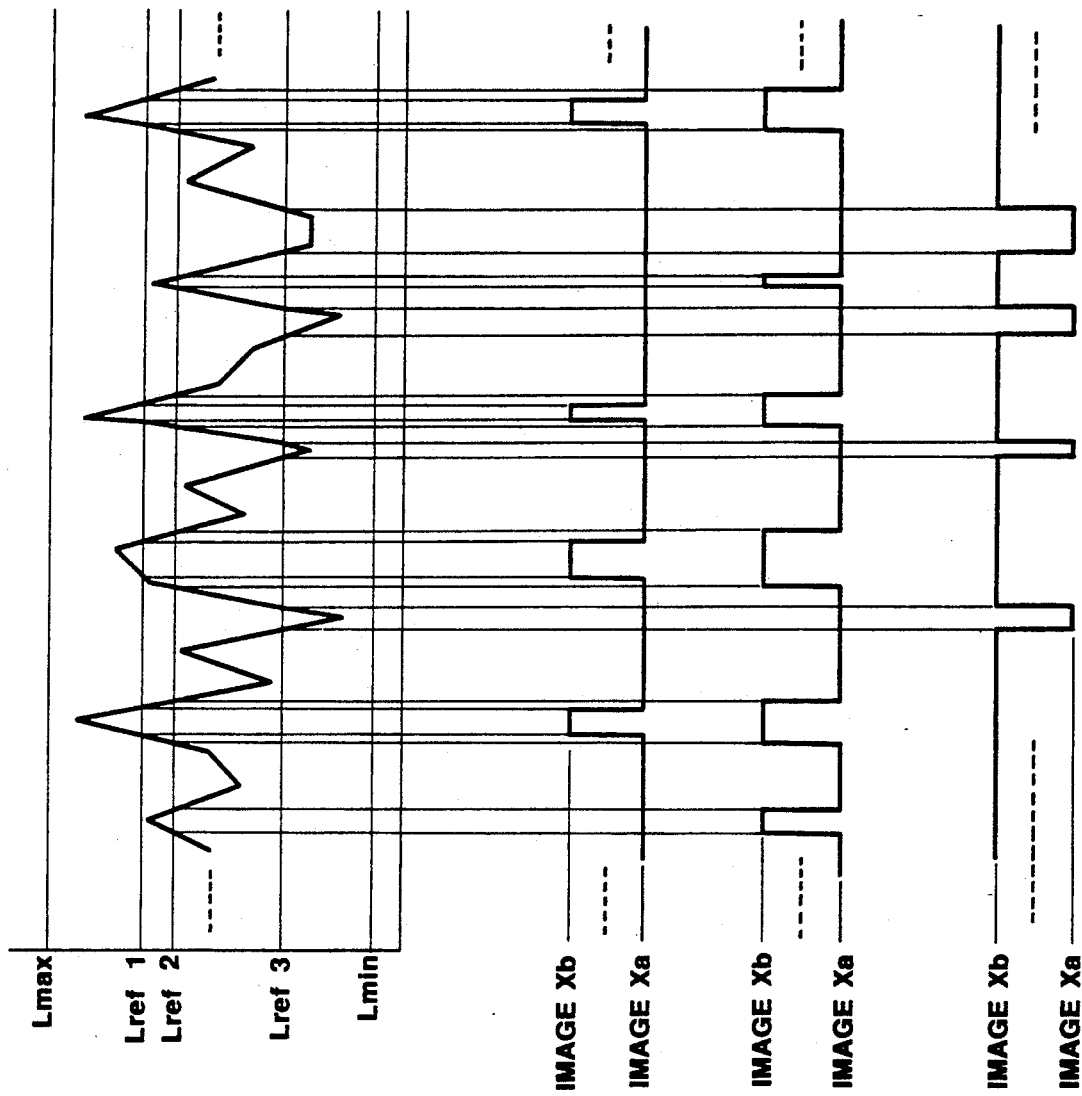
FIGS. 6A-6D are waveform diagrams which are helpful in understanding a noise wipe switching operation.

One effect of using recursive filters to control flicker and shape in the video display is a reduction in the peak amplitude of the filtered noise signal This is analogous to low pass filtering of the noise signal. If the original random noise signal exhibits the waveform shown in FIG. 5A with a peak value of $P_1$, the recursive-filtered noise signal produced at the output of the cascaded filters appears as shown in FIG. 5B with a reduced peak value $P_2$. Since image switch over is dependent upon whether the filtered noise signal exceeds a gradually reduced threshold, as shown in FIGS. 6A-6D, it is preferable to restore the filtered noise signal to its original peak value $P_1$. This is achieved by the gain controlled operation of variable gain amplifier 41 whose gain is set as a function of the peaks $P_2$ in the filtered noise signal, as detected by peak detector 42. FIG. 5C illustrates the peak restoration operation carried out by gain controlled amplifier 41 to restore to the filtered noise signal the original peak value $P_1$.

While the present invention has been particularly shown and described with reference to a preferred embodiment, it will be readily appreciated by those of ordinary skill in the art that various changes and modifications may be made without departing from the spirit and scope of the invention. For example, the particular order or sequence in which the respective filter circuits 10, 20 and 30 are connected can be altered. However, it is preferred that the random noise signal produced by random noise generator 1 be subjected to a time change filtering operation first because this makes it simpler for the operator to effect a shape change operation. That is, undesired flicker will be minimized and thus will not disturb the operator as he adjusts coefficients $K_2$ and $K_3$ in effecting a shape change. In setting these coefficients $K_2$ and $K_3$ to a desired level, the operator may prefer to reduce coefficient $K_1$ to 0 so as to eliminate all flicker in the video display.

Although delay circuit 13 has been shown and described as a field delay circuit, it may, alternatively, impart a time delay equal to a multiple of video field periods. For example, delay circuit 13 may impart a time delay equal to two fields, or one video frame. However, since flicker is minimized by reason of the recursive filtering operation carried out by filter 10, the larger capacity (and, thus, the greater cost) of a frame delay circuit is superfluous and not needed.

Still further, although three recursive filters are illustrated in FIG. 1, a modification of the present invention contemplates the use of only one recursive filter, resulting in a time change filtering operation of the noise signal (as when only filter circuit 10 is used) or a horizontal shape filtering operation of the noise signal (as when only filter circuit 20 is used) or in a vertical shape filtering operation of the noise signal (as when only filter circuit 30 is used). Thus, time change filtering and/or shape changing may be effected in accordance with the particular filter circuits connected to random noise generator 1.

It is intended that the appended claims be interpreted as covering the embodiment specifically described herein, those alternatives which have been discussed above, and all equivalents thereto.

What is claimed is:

1. Apparatus for producing special video effects, comprising: random noise generating means for generating a random noise signal; filtering means for filtering the random noise signal, said filtering means having a variable filter characteristic controllable by an adjustable filter control signal; reference generating means for generating a reference level that changes with respect to time; comparator means coupled to said filtering means and said reference generating means for comparing the filtered random noise signal with said reference level; and switch means supplied with first and second video signals and responsive to said comparator means for selecting one or the other of said video signals as a function of whether the filtered random noise signal exceeds said reference level.

2. The apparatus of claim 1 wherein said filtering means includes a recursive filter having a recursive operation determined by said filter control signal.

3. The apparatus of claim 2 wherein said filter control signal is adjustable by an operator.

4. The apparatus of claim 1 wherein said filtering means comprises a time change filter responsive to said filter control signal for filtering changes in said random noise signal over time to reduce flicker in a video display of the filtered random noise signal.

5. The apparatus of claim 1 wherein said filtering means comprises delay means, gain adjusting means for supplying said random noise signal of adjustable gain to said delay means, feedback means coupled to said delay means for feeding back an adjustable amount of delayed random noise signal, and combining means for combining the fed back delayed random noise signal with the supplied adjustable gain random noise signal.

6. The apparatus of claim 5 wherein said gain adjusting means and said feedback means are responsive to said adjustable filter control signal.

7. The apparatus of claim 6 wherein said gain adjusting means comprises first multiplier means for multiplying said random noise signal by a factor K determined by said adjustable filter control signal; and said feedback means comprises second multiplier means for multiplying the filtered random noise signal by a factor $(1-K)$.

8. The apparatus of claim 7 wherein said delay means has a time delay substantially equal to a multiple of a video field period.

9. The apparatus of claim 8 wherein said multiple is 1.

10. The apparatus of claim 7 wherein said delay means has a time delay substantially equal to a horizontal line period.

11. The apparatus of claim 7 wherein said delay means has a time delay substantially equal to a fraction of a horizontal line period.

12. The apparatus of claim 11 wherein a horizontal line period encompasses a plurality of time samples, and said fraction comprises m samples, where m=1, 2, 3, ...

13. The apparatus of claim 1 wherein said filtering means comprises a shape change filter responsive to said filter control signal for filtering changes in said random noise signal to modify a shape in a video display of the filtered random noise signal.

14. The apparatus of claim 13 wherein said shape change filter is a horizontal shape change filter for adjusting the displayed shape in a horizontal direction.

15. The apparatus of claim 13 wherein said shape change filter is a vertical shape change filter for adjusting the displayed shape in a vertical direction.

16. The apparatus of claim 1 wherein said filtering means comprises time change filter means and shape change filter means connected in cascade, the time change filter means being responsive to a time filter control signal for filtering changes in the random noise signal over time to reduce flicker in a video display of the filtered random noise signal; and the shape change filter means being responsive to a shape filter control signal for filtering changes in the random noise signal to adjust a shape in the video display of the filtered random noise signal.

17. The apparatus of claim 16 wherein said time change filter means comprises a first recursive filter having a recursive operation determined by said time filter control signal; and said shape change filter means comprises a second recursive filter having a recursive operation determined by said shape filter control signal.

18. The apparatus of claim 17 wherein said shape change filter means additionally comprises a third recursive filter having a recursive operation determined by a further shape filter control signal, said second recursive filter being operable to adjust the shape in the video display of the random noise signal in a horizontal direction and said third recursive filter being operable to adjust the shape in the video display of the random noise signal in a vertical direction.

19. The apparatus of claim 18 wherein each recursive filter is comprised of delay means having an input and an output and operable to delay a signal supplied thereto by a predetermined amount; multiplier means for receiving the random noise signals and for multiplying same by a respective coefficient K determined by a respective one of said time filter, shape filter and further shape filter control signals; feedback means coupled to the output of said delay means for multiplying a delayed output signal therefrom by a respective coefficient $(1-K)$ and feeding back the multiplied output signal; and summing means coupled to said multiplier means and said feedback means for summing the multiplied random noise signal and the multiplied output signal and for supplying the summed signals to said delay means.

20. The apparatus of claim 1 wherein said comparator means includes variable gain means for varying the gain of the filtered random noise signal that is compared with said reference level as a function of peak levels included in said filtered random noise signal.

21. The apparatus of claim 20 wherein said variable gain means includes a variable gain amplifier for amplifying the filtered random noise signal; and peak detecting means for detecting peaks in said filtered random noise signal and varying the gain of said amplifier in accordance with the detected peaks.

22. Image switching apparatus for selecting first or second video signals supplied to such apparatus, comprising: switch means having inputs connected to receive said first and second video signals and an output; and switch control means for producing a switch control signal to control said switch means to couple either said first video signal or said output video signal to said output, said switch control means including:
random noise generating means for generating a random noise signal; shape control means coupled to said random noise generating means for processing the random noise signal to modify a shape in a video display of said random noise signal; reference generating means for generating a reference level that changes with time; and comparator means coupled to said shape control means and to said reference generating means for comparing the processed random noise signal to the reference level to supply a switch control signal to said switch means as a function of the comparison.

23. The apparatus of claim 22 wherein said shape control means comprises filter means having an adjustable filtering characteristic in response to a filter coefficient signal supplied thereto, and coefficient input means for supplying to said filter means a filter coefficient signal to establish said filter characteristic.

24. The apparatus of claim 23 wherein said filter means comprises a recursive filter having a recursive operation determined by said filter coefficient signal.

25. The apparatus of claim 24 wherein said recursive filter comprises delay means having an input and an output and operable to delay a random noise signal supplied thereto by a predetermined amount; first multiplier means for receiving the random noise signal and a filter coefficient signal K to multiply the received signals to produce a first multiplied signal; second multiplying means coupled to the output of said delay means and supplied with a coefficient $(1-K)$ for multiplying the delayed random noise signal with said coefficient $(1-K)$ to produce a second multiplied signal; and feedback means for feeding back the second multiplied signal and combining the same with the first multiplied signal and for supplying the combined signals to the input of said delay means.

26. The apparatus of claim 25 wherein said delay means imparts a delay substantially equal to one horizontal line period.

27. The apparatus of claim 25 wherein said delay means imparts a delay substantially equal to a fraction of one horizontal line period.

28. The apparatus of claim 23 wherein said filter means comprises first and second recursive filters connected in cascade and having recursive operations determined by respective filter coefficient signals.

29. The apparatus of claim 28 wherein
the first recursive filter comprises first delay means having an input and an output and operable to delay a random noise signal supplied thereto by a first predetermined amount; first multiplier means for receiving a random noise signal and a first filter coefficient signal $K_1$ to multiply the signals received thereby to produce a first multiplied signal; second multiplying means coupled to the output of said first delay means and supplied with a coefficient $(1-K_1)$ for multiplying the random noise signal delayed by said first delay means with said coefficient $(1-K_1)$ to produce a second multiplied signal; and first feedback means for feeding back the second multiplied signal and combining same with the first multiplied signal and supplying the signals combined thereby to the input of said first delay means; and
the second recursive filter comprises second delay means having an input and an output and operable to delay a random noise signal supplied thereto by a second predetermined amount; third multiplier means for receiving a random noise signal and a second filter coefficient signal $K_2$ to multiply the signals received thereby to produce a third multiplied signal; fourth multiplying means coupled to the output of said second delay means and supplied with a coefficient $(1-K_2)$ for multiplying the random noise signal delayed by said second delay means with said coefficient $(1-K_2)$ to produce a fourth multiplied signal; and second feedback means for feeding back the fourth multiplied signal and combining same with the third multiplied signal and supplying the signals combined thereby to the input of the second delay means.

30. The apparatus of claim 29 wherein the first delay means delays the random noise signal supplied thereto by a horizontal line period and the second delay means delays the random noise signal supplied thereto by a fraction of a horizontal line period.

31. The apparatus of claim 28 wherein said switch control means further includes gain controlled amplifying means for coupling the random noise signal filtered by the cascaded recursive filters to said comparator means.

32. The apparatus of claim 31 wherein said gain controlled amplifying means comprises a variable gain amplifier and peak detecting means for detecting peaks in the filtered random noise signal to vary the gain of said amplifier in accordance therewith.

33. Image switching apparatus for selecting first or second video signals supplied to such apparatus, comprising: switch means having inputs connected to receive said first and second video signals and an output; and switch control means for producing a switch control signal to control said switch means to couple either said first video signal or said second video signal to said output, said switch control means including:

random noise generating means for generating a random noise signal; time control means coupled to said random noise generating means for processing the random noise signal to modify changes therein over time; reference generating means for generating a reference level that changes with time; and comparator means coupled to said time control means and to said reference generating means for comparing the processed random noise signal to the reference level to supply a switch control signal to said switch means as a function of the comparison.

34. The apparatus of claim 33 wherein said time control means comprises filter means having an adjustable filtering characteristic in response to a filter coefficient signal supplied thereto, and coefficient input means for supplying to said filter means a filter coefficient signal to establish said filter characteristic.

35. The apparatus of claim 34 wherein said filter means comprises a recursive filter having a recursive operation determined by said filter coefficient signal.

36. The apparatus of claim 35 wherein said recursive filter comprises delay means having an input and an output and operable to delay a random noise signal supplied thereto by a predetermined amount; first multiplier means for receiving the random noise signal and a filter coefficient signal K to multiply the received signals to produce a first multiplied signal; second multiplying means coupled to the output of said delay means and supplied with a coefficient $(1-K)$ for multiplying the delayed random noise signal with said coefficient $(1-K)$ to produce a second multiplied signal; and feedback means for feeding back the second multiplied signal and combining the same with the first multiplied signal and for supplying the combined signals to the input of said delay means.

37. The apparatus of claim 36 wherein said delay means imparts a delay substantially equal to one video field period.

38. The apparatus of claim 37 wherein said switch control means further includes gain controlled amplifying means for coupling the delayed random noise signal form said delay means to said comparator means.

39. The apparatus of claim 38 wherein said gain controlled amplifying means comprises a variable gain amplifier and peak detecting means for detecting peaks in the delayed random noise signal to vary the gain of said amplifier in accordance therewith.

* * * * *